United States Patent [19]

Hiramatsu

[11] Patent Number: 4,457,411

[45] Date of Patent: Jul. 3, 1984

[54] TORQUE TRANSMISSION DEVICE

[75] Inventor: Takeo Hiramatsu, Kyoto, Japan

[73] Assignee: Mitsubishi Jidosha Kogyo Kabushiki Kaisha, Tokyo, Japan

[21] Appl. No.: 267,627

[22] Filed: May 27, 1981

[30] Foreign Application Priority Data

Jun. 2, 1980 [JP] Japan .................................. 55-74064
Jun. 24, 1980 [JP] Japan .................................. 55-85579

[51] Int. Cl.³ ...................... B60K 41/02; F16H 45/02
[52] U.S. Cl. ............................... 192/0.076; 192/3.31;
192/3.56; 192/3.58
[58] Field of Search ............... 192/0.076, 0.075, 0.07,
192/0.048, 0.032, 0.033, 0.034, 0.03, 3.31, 3.58,
3.56; 74/866, 731; 361/242; 180/176, 179

[56] References Cited

U.S. PATENT DOCUMENTS 3,265,169 8/1966 Aschauer .

Primary Examiner—George H. Krizmanich
Attorney, Agent, or Firm—Robert E. Burns; Emmanuel J. Lobato; Bruce L. Adams

[57] ABSTRACT

A torque transmission device for eliminating the transmission of tortional vibration from a driving shaft to a driven shaft comprises a clutch capable of controlled slippage so that the speed of rotation of the driven shaft is lower than the speed of the driving shaft. Slippage of the clutch is controlled by sensing the speed of rotation and the fluctuation of the speed of rotating of the driving shaft and the speed of rotation of the driven shaft and regulating slippage so that the difference in rotation speed between the two shafts is greater than the fluctuation in rotation speed of the driving shaft. The clutch may be an electromagnetic clutch of which the exciting current is controlled or a friction clutch actuated by controlled hydraulic pressure. The clutch may be in parallel with a fluid coupling.

13 Claims, 11 Drawing Figures

4,457,411

TORQUE TRANSMISSION DEVICE

DETAILED DESCRIPTION OF THE PREFERRED EMBODIMENT OF THE INVENTION

This invention relates to a torque transmission device.

BACKGROUND OF THE INVENTION

In an internal combustion engine having a reciprocating piston therein, there is a torque fluctuation caused by the inertia of the reciprocating piston as well as another torque fluctuation caused by a fluctuation of pressure in the combustion chamber, and further the output shaft is rotated along with the fluctuation in torque and the fluctuation in the rotation speed thereof. This fluctuation in torque may impair the performance of driving a vehicle having an internal combustion engine as fluctuation in torque is transmitted to the vehicle and the driving shaft etc. in particular in low speed operation, so that even if a mean driving torque is sufficient for operating the vehicle, a minimum operating speed would substantially be increased due to generation of a vibratory movement caused by a fluctuation in torque. Due to this fact, a car driver must select such a transmission step having a high gear ratio and further there have been such disadvantages as an increased rotation speed of the internal combustion engine and a high cost of fuel as well as a noise etc. And said fluctuation in torque is transmitted to a gear reducer or a transmission unit in particular in case of an idling operation, resulting in making some vibratory movements of the gears and shafts found in the transmission unit to produce some rattle sounds therein.

It is a principal object of the present invention to provide a torque transmission device in which a highly efficient torque transmitting operation is performed without transmitting any fluctuation in torque of the driving shaft to an output shaft, vibration and noise are prevented and fuel consumption may be reduced.

Another object of the present invention is to provide a torque transmission device for an internal combustion engine installed in a vehicle in which a range of low speed rotation available for the engine may be extended, driving of the vehicle may easily be performed, resulting in decreasing fuel consumption.

Yet another object of the present invention is to provide a torque transmission device in which torque may be transmitted via clutch without having any cooperation with a fluid coupling by a method wherein the clutch of the present invention is arranged in parallel with the fluid coupling of said transmission device in a driving system of a motor vehicle having a fluid coupling type automatic transmission device, resulting in preventing an excessive slip which is peculiar to the fluid coupling.

Other objects of the present invention may be accomplished as illustrated in the following preferred embodiments of the present invention.

SUMMARY OF THE INVENTION

The foregoing objects of the present invention may be accomplished by a torque transmission device comprising of a driving shaft connected to a power source having a tortional vibration, an output shaft, a clutch which may be slipped between said shafts, means for sensing a rotation speed difference between said driving shaft and output shaft, and a transmitting torque control device for said clutch and having a feature that the transmitting torque of said clutch may be controlled in such a way as said rotation speed difference may exceed the variable rotation speed of said driving shaft.

DESCRIPTION OF THE PREFERRED EMBODIMENTS

Figure 1:
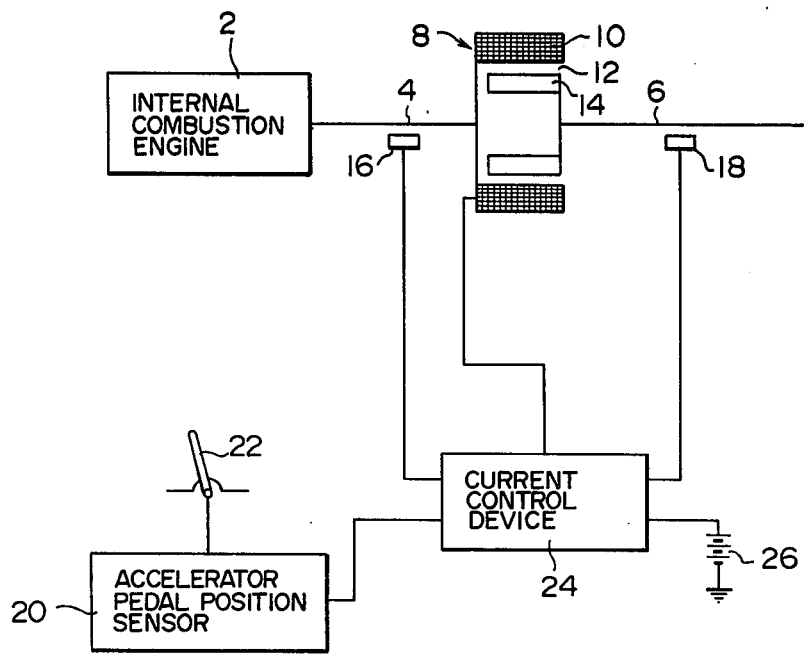
FIG. 1 is a schematic illustration of the first preferred embodiment of the present invention.

Referring now to FIGS. 1 to 6 showing a first preferred embodiment of the present invention which is applied to a motor vehicle.

Reference numeral 2 indicates an internal combustion engine in which a driving shaft 4 is driven to rotate with a fluctuation in torque, reference numeral 6 shows an output shaft which is connected to the driving shaft 4 via electro-magnetic clutch 8, the output shaft driving the wheels through a transmission unit (not shown).

The electro-magnetic clutch 8 is a well-known electro-magnetic clutch having electro-magnetic powders which are solidified under a magnetic force. The electro-magnetic clutch has a clutch-coil 10 arranged on the driving shaft 4, and a driven member 14 which is arranged with the clutch-coil 10 with a clearance 12 being made therebetween and also arranged on the output shaft 6, and further some magnetic powders are filled or charged in said clearance 12.

Reference numeral 16 indicates a rotation speed sensor for detecting the rotation speed of the driving shaft 4, reference numeral 18 shows a roration speed sensor for detecting the rotation speed of the output shaft 6, reference numeral 20 indicates an accelerator pedal position sensor for the accelerator pedal 22, reference numeral 24 shows an electric current control device for controlling electric current flowing in the clutch-coil 10 of the electro-magnetic clutch 8 in response to a signal from each of the sensing devices. Reference numeral 26 shows a power supply.

The rotation speed sensors 16 and 18 are constructed such that they have a winding and a permanent magnet which are conventionally used in the art. Projections or holes arranged in the shafts 4 and 6 may vary a magnetic flux of said permanent magnet under their rotation, resulting in producing an induced electromotive force of a pulse signal in the winding, the rotation speed of the shaft is sensed in reference to the number of pulse signals. The accelerator pedal position sensor 20 is made of a conventional type of a variable resistor of which the value is changed in response to the position of the accelerator pedal 22.

Figure 2:
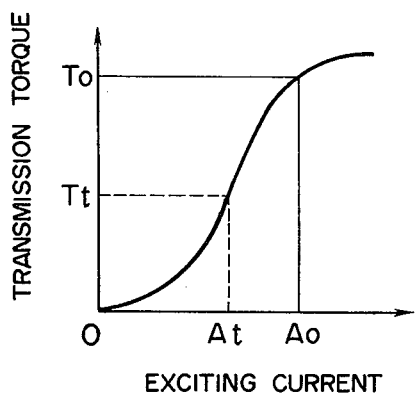
FIG. 2 is a view for showing the performance of an energizing current to be fed to an electro-magnetic clutch and a transmitting torque.
Figure 3:
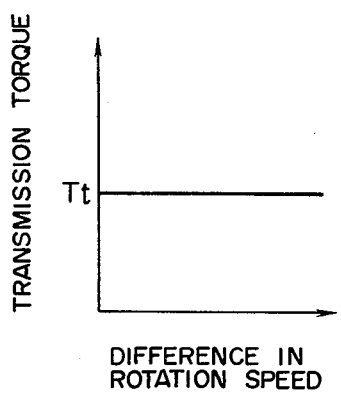
FIG. 3 is a view for showing a characteristic of a rotational speed difference of an electro-magnetic clutch and its transmitting torque.
Figure 4:
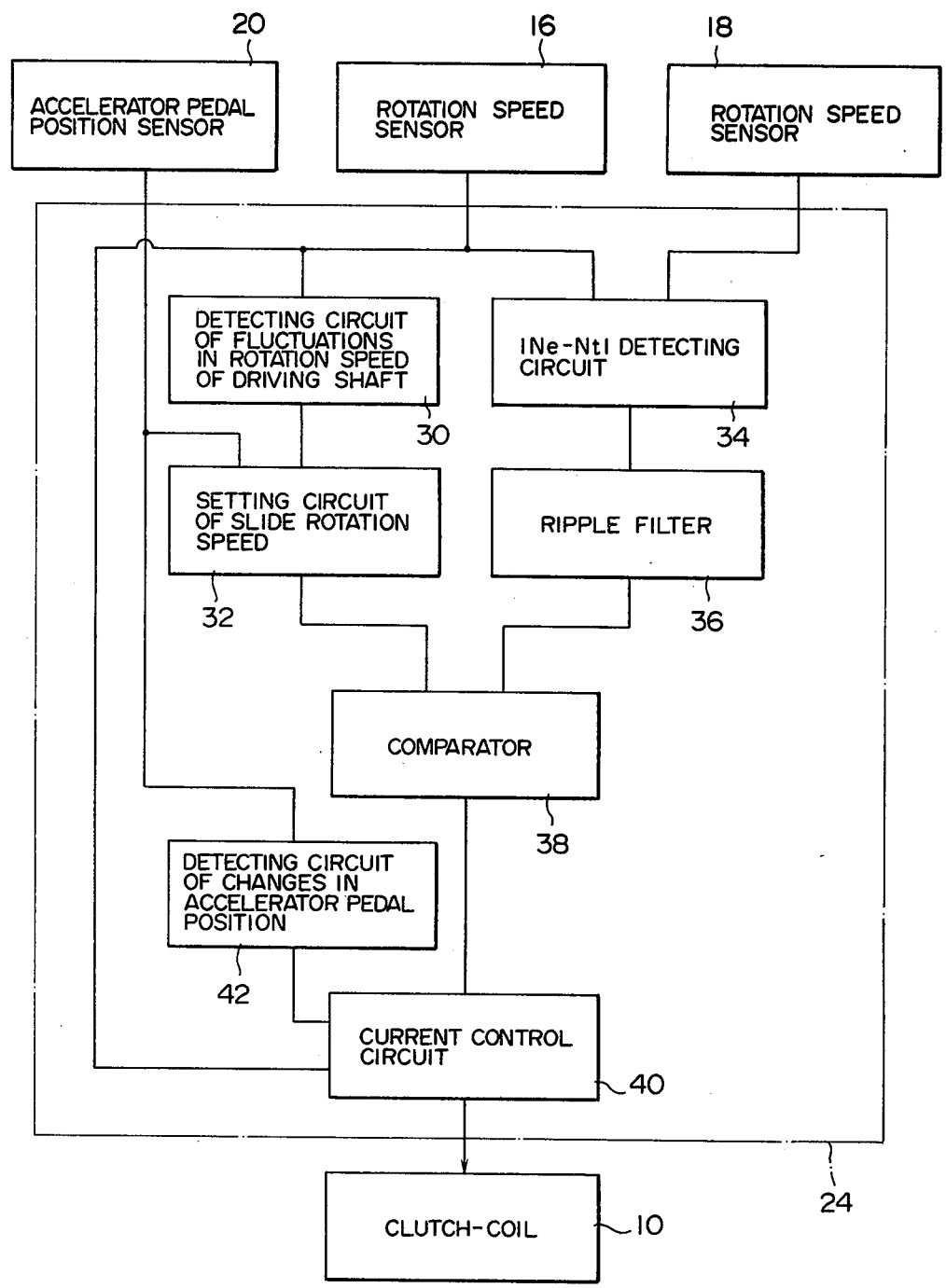
FIG. 4 is a schematic illustration of a control device for feeding and controlling an electric current against an electro-magnetic clutch.
Figure 5:
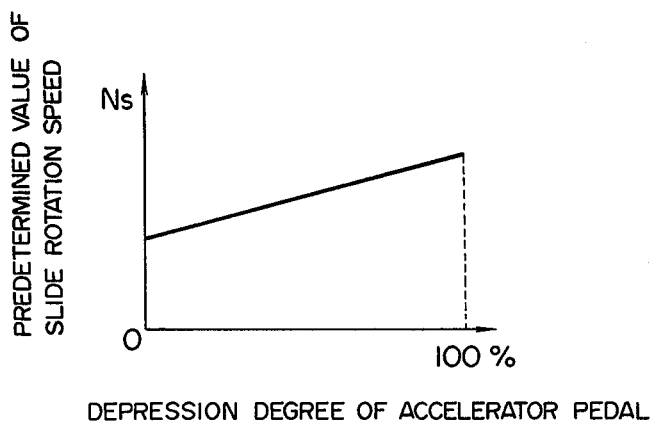
FIG. 5 is a view for showing a performance of acceleration pedal position with respect to a slide rotation speed difference.
Figure 6:
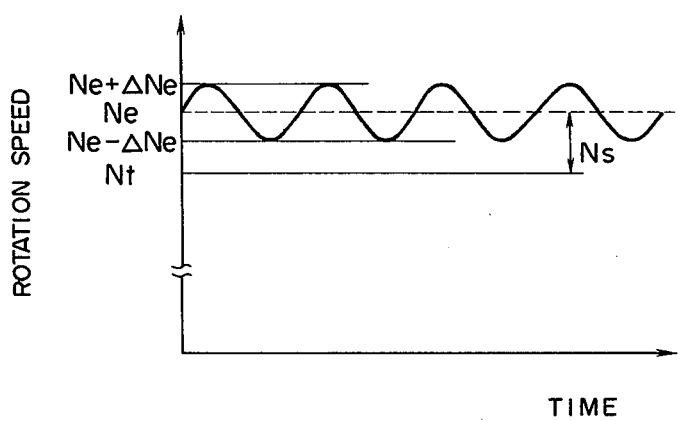
FIG. 6 is a view for showing a rotation speed relation between a driving shaft and an output shaft.

The electro-magnetic clutch 8 is operated such that the driven member 14 is operated by a retraction of some magnetic powders in the clearance 12 between the clutch-coil 10 and the driven member 14 as well as under a friction against said magnetic powders or by an electro-magnetic force from the clutch-coil 10, both an exciting electric current fed to the clutch-coil 10 and the transmitting torque having a performance characteristic shown in FIG. 2. That is, the transmitting torque Tt is gradually increased as the electric current At is increased, and when it reaches a desired maximum energizing current Ao, the transmitting torque To shows substantially a maximum value and so even if the current At is increased more than the specified value, the transmitting torque may not be increased more due to its saturated condition. Further, said electro-magnetic clutch 8 has no relation with a rotation speed difference between the driving shaft 4 and the output shaft 6 when a predetermined electric current At is being fed, as shown in FIG. 3, and further the transmitting torque has such a characteristic as it becomes substantially constant corresponding to said electric current At. So even if a driving torque of the clutch-coil 10, i.e. the driving shaft 4 is higher than the transmitting torque Tt, a torque to be transmitted to the driven member 14, i.e. the output shaft 6 is not higher than a value of Tt, and the driving shaft 4 slips with respect to the output shaft 6, so that the transmitting torque T is not changed even if a rotation speed difference caused by a slip is varied. In a preferred embodiment, an electric current to be fed to the clutch-coil 10 of said electro-magnetic clutch 8 is controlled in such a manner as shown in FIGS. 4 to 6.

At first, a rotation speed Ne of the driving shaft 4 is sensed by the rotation speed sensor 16, a fluctuation in rotational speed ±ΔNe per unit time is sensed by a detecting circuit 30 of fluctuations in rotation speed of driving shaft 4 and at the same time a predetermined slipping rotation speed Ns higher than the fluctuation in rotation speed ΔNe is set by a setting circuit of slide rotation speed 32.

An absolute value of |Ne-Nt| of the difference between the rotation speed Ne of the driving shaft 4 sensed by a rotation speed sensor 16 and the rotation speed Nt of the output shaft 6 sensed by a rotation speed sensor 18 is sensed by |Ne-Nt| detecting circuit 34, and the absolute value of the difference above is filtered by a ripple filter 36 to detect a ripple value No.

Then, the signals from the circuit 32 and the circuit 36 are compared by a comparator 38, said ripple value No. and the predetermined slide rotation speed Ns, and controlled as follows.

(i) In case of No>Ns:
An electric current to be fed to the clutch-coil 10 by a current control circuit 40 is made to be increased, and the value of No is decreased.

(ii) In case of No<Ns:
An electric current to be fed to the clutch-coil 10 by a current control circuit 40 is made to be decreased, and the value of No is made to be increased.

(iii) In case of No=Ns:

An electric current to be fed in the clutch-coil 10 is not changed. To the setting circuit of slide rotation speed 32 is fed a signal from the accelerator pedal position sensor 20 for the accelerator pedal 22, and as shown in FIG. 5, the setting value of the slide rotation speed Ns is corrected so as to be increased as the accelerator pedal position of the accelerator pedal 22 is made to be increased.

Further, to the current control circuit 40 is fed a signal from the rotation speed sensor 16 and a maximum electric current is fed to the clutch-coil 10 in case that the driving shaft 4 exceeds a predetermined rotation speed, for example more than 2,000 rpm.

Each of the circuits in said control device 24 shows a differential time required for converting a signal from each of the sensor units or calculating the same, so that a delay in response may be expected.

Therefore, due to the fact that a variation in electric current to be fed to the clutch-coil 10 is delayed by said delay in response during its acceleration or decceleration operation, a decreased electric current is not made under such an operating condition as the value of |Ne-Nt| is rapidly lowered, and the fluctuation in torque might be transmitted as apparent from the description below. Reference numeral 42 indicates a detecting circuit of changes in accelerator pedal position for use in detecting a variation in the pedal position, the circuit 42 is constructed such that it is made of a conventional differential circuit for sensing a variation in accelerator pedal position in response to a signal from the accelerator pedal position sensor 20 and operated in such a way as a signal for correcting a delay in response is produced from the current control circuit 40 when the accelerator pedal 22 is returned back from its depressed condition.

Operation of said preferred embodiment of the present invention will be described in reference to FIG. 6. The driving shaft 4 is driven to rotate by an engine 2 with a fluctuation of rotation speed ±ΔNe caused by a fluctuation in torque with respect to a rotation speed Ne.

To the contrary, the output shaft 6 is driven to rotate at a rotation speed of Nt in such a manner as an electric current to be fed to the clutch-coil 10 of the electro-magnetic clutch 8 is controlled by the current control device 24.

That is, the output shaft 6 is rotated at a rotation speed Nt lower than the fluctuation in rotation speed ±ΔNe caused by said fluctuation in torque by a value corresponding to a slide rotation speed Ns with respect to the rotation speed Ne of the driving shaft 4 showing the fluctuation in torque, and a transmitting torque of the electro-magnetic clutch 8 under this condition is set at a torque lower than that of the driving shaft 4.

Therefore, the torque to be transmitted to said output shaft 6 is controlled to show a specified torque without having any relation with the fluctuation of rotation speed of the driving shaft 4 and the fluctuation in torque, so that the fluctuation in torque of the driving shaft 4 is not transmitted.

In case that an accelerator pedal position shows a high value with the increased fluctuation in torque an appropriate slide rotation speed of a wide range of operation may be set by increasing the predetermined slide rotation speed Ns, and a characteristic of response may be improved by decreasing the slide rotation speed when the accelerator pedal position shows a low value.

Further, when the rotation speed of the driving shaft Ne exceeds more than 2,000 rpm, a maximum electric current is fed to the clutch-coil 10 of the electro-magnetic clutch 8, resulting in making a direct operation of said electro-magnetic clutch 8 to improve a characteristic of response.

When the accelerator pedal 22 is moved from its depressed acceleration condition to its regular speed running condition, the current control circuit 40 is operated by the signals from the detecting circuit of changes in accelerator pedal position 42, an electric current to be fed to the clutch-coil 10 is reduced to its half value for a desired period of time or feeding of the electric current is terminated.

As described above, in accordance with a preferred embodiment of the present invention, torque of the driving shaft 4 to be rotated with the fluctuation in torque is transmitted to the output shaft 6 through electro-magnetic clutch 8. An exciting current for said electro-magnetic clutch 8 is controlled in such a way as the following relation is fulfilled, $$|Ne-Nt| - \Delta Ne > 0$$

where, Ne is a mean rotation speed of the driving shaft 4, $\pm \Delta Ne$ is the fluctuation in rotation speed, Nt is a rotation speed of the output shaft 6, and under this condition a torque is transmitted, so that a fluctuation in torque of the driving shaft 4 is not transmitted to the output shaft 6, but only a specified stable torque is transmitted, resulting in that a characteristic of operation of a vehicle may be improved. Further, a characteristic of operation under a low speed of the vehicle may be improved so as to reduce fuel consumption as well as to decrease noise.

Further, it is possible to eliminate almost of all of the fluctuation in torque to be transmitted to a transmission unit during an idling operation, resulting in showing an effect for decreasing some rattle sounds produced from said transmission unit.

Further, in accordance with a preferred embodiment of the present invention, since an exciting current to be fed to the clutch-coil 10 is low as compared with a maximum electric current in an operation range having a slip in the electro-magnetic clutch 8, power consumption found in the electro-magnetic clutch 8 is reduced to show an economical saving system.

In the above mentioned preferred embodiment of the present invention, an electric current to be fed to the clutch-coil 10 is controlled in response to each of the signals from the accelerator pedal position sensor 20 for the accelerator pedal 22 and the rotation speed sensor 16 of the driving shaft 4 and the rotation speed sensor 18 for detecting a rotation speed of the output shaft 6. However, a similar operational effect as that found in said preferred embodiments may be made by such a system as the fluctuation in rotation speed of the output shaft 6 or the fluctuation in torque of the output shaft 6 is detected and an electric current to be fed to the clutch-coil 10 is reduced when the fluctuation in rotation speed or the fluctuation in torque of said output shaft 6 is found.

Referring now to FIGS. 7 to 9(b), a second preferred embodiment of the present invention will be described.

Reference numeral 102 indicates an internal combustion engine in which a driving shaft 104 is operated to rotate with a fluctuation in its torque, 106 is an output shaft connected to the driving shaft 104 via clutch device 108, and 110 is a transmission unit for use in transmitting a driving force from the output shaft 106 to the wheels (not shown). The clutch device 108 is provided with a fly-wheel 112 fixed to the driving shaft 104, an annular piston 116 forming a hydraulic chamber 114 in said fly-wheel 112 and operating under a hydraulic pressure in the hydraulic chamber 114, and a driven member 122 having a clutch disk 120 installed between a piston 116 and a flange 118 of the fly-wheel 112, the driven member 122 being fixed to the output shaft 106.

Reference numeral 124 indicates a hydraulic feeder device for use in feeding hydraulic oil to the hydraulic chamber 114, the hydraulic feeder device being composed of a hydraulic generator device 126, and a hydraulic control device 128 for controlling hydraulic pressure produced from the hydraulic generator device 126.

The hydraulic pressure generator device 126 has a hydraulic pump 130 for suctioning the oil stored in an oil reservoir 129 and producing a hydraulic pressure, a spool valve 132 for adjusting a hydraulic pressure produced by the hydraulic pump 130, the spool value 132 having a first land 134 and a second land 136 of which cross sectional areas are different with each other. The right end surface 138 of the first land 134 as viewed in the drawing is faced toward a hydraulic oil feeding passage 140 communicated with the hydraulic pump 130, a hydraulic feeding chamber 142 formed between the left end surface 135 of the first land 134 as viewed in the drawing and the right end surface 137 of the second land 136 as viewed in the drawing is communicated with the hydraulic chamber 114 of said fly-wheel 112 through the hydraulic passage 144, a control valve 148 to be described later is arranged at an opening 146 of said hydraulic feeding passage 140, said opening 146 is released to the surrounding atomosphere and is communicated with the oil reservoir 129, and a hyraulic pressure is produced in the hydraulic feeding passage 140 by opening or closing the control valve 148.

A spring 152 is abutted against the left end surface 150 of the second land 136 as viewed in the drawing, said left end surface 150 is communicated with the oil reservoir 129 through passage 154. Reference numeral 155 indicates a relief passage for communicating the hydraulic pressure feeding chamber 142 with the oil reservoir 129 at the end of rightward stroke motion of the spool valve 132 starting the position illustrated in the drawing, and reference numeral 156 shows a hydraulic pressure feeding passage in which the spool valve 132 communicates the hydraulic pressure feeding chamber 142 with the orifice 158 arranged in the hydraulic pressure feeding passage 140 and the oil pump 130 at the end of the leftward stroke.

A relation with said spool valve 132 being balanced may be expressed as follows;

$$APo = F + (A-B)P_1$$

where, A is the cross sectional area of the first land 134, B is the cross sectional area of the second land 136, F is the biasing force of the spring 152, Po is the hydraulic pressure in the hydraulic pressure feeding passage 140, and $P_f$ is the hydraulic pressure in the hydraulic pressure feeding passage 156 communicated between the oil pump 130 and the orifice 158, and $P_1$ is a hydraulic pressure in the hydraulic pressure feeding chamber 142. Hydraulic pressure control device 128 is provided with a rotation speed sensor 160 for detecting the rotation speed of the driving shaft 104, a rotation speed sensor 162 for sensing the rotation speed of the output shaft 106, an accelerator pedal position sensor 166 for sensing the depression degree of the accelerator pedal 164, and an electric current control device 172 for controlling electric current flowing in a solenoid 170 for driving the control valve 148 under an application of a modulation in pulse width in a response to a signal from each of the sensor devices.

The solenoid 170 is a duty control solenoid valve which is normally closed when energized and in the preferred embodiment of the present invention it is operated to open or close with a value of 20 Hz. A frequency of opening or closing of the solenoid valve is set in reference to a response of the solenoid valve 170 and a bad effect of the hydraulic pressure Po against a clutch operating hydraulic pressure. Reference numeral 168 indicates a power supply. Said clutch device 108 performs a control operation over a transmitting action for a torque under such an action as the piston 116 is slid by a hydraulic pressure from the hydraulic pressure chamber 114, a clutch disk 120 is frictionally engaged between said piston 116 and the flange 118 or removed therefrom. In turn, as a facing material for the clutch disk 120, an organic friction material generally applied in a motor vehicle can be used, and it is preferable to have a variation of coefficient of friction caused by a sliding speed that is a characteristic of $\mu-v$ as flat as possible, and in reference to this fact, a rate of variation of coefficient of friction caused by a sliding speed may be decreased if a somewhat soft organic friction material is applied in a conventional manner. In this type of clutch device 108 having such a facing material as described above, a transmitting torque of the driving shaft 104 is high in its value, a torque is transmitted with the driving shaft 104 and the output shaft 106 being slipped relative to each other, as illustrated in FIG. 3 of said first preferred embodiment, only a specified torque is transmitted to the output shaft 106.

Then, referring to FIGS. 8 to 9, there will be described a hydraulic pressure feeding device 124 for feeding a hydraulic pressure to the hydraulic chamber 114 of such clutch device 108.

At first, a mean rotation speed Ne of the driving shaft 104 is sensed by a rotation speed sensor 160, the fluctuation in rotation speed $\pm\Delta Ne$ per unit time with respect to a mean rotation speed Ne is sensed by a sensor circuit 180 for sensing the fluctuation in rotation speed of the driving shaft and at the same time a predetermined slide rotation speed Ns higher than the fluctuation in rotation speed $\Delta Ne$ as illustrated in FIG. 6 is set by a setting circuit of slide rotation speed 182.

An absolute value of a difference $|Ne-Nt|$ between a mean rotation speed Ne sensed by a rotation speed sensor 160 for the driving shaft 104 and a mean rotation speed Nt sensed by a rotation speed sensor 162 for the output shaft 106 is sensed by a circuit 184 for sensing the value of $|Ne-Nt|$, then the absolute value of a difference is smoothed by the ripple filter 186 to detect a smoothed value No.

Then, the signals from the circuit 182 and the circuit 186 are compared by the comparator 188, said smoothed value No and the predetermined slide rotation speed Ns are compared, then controlled as follows.

Figure 9A:
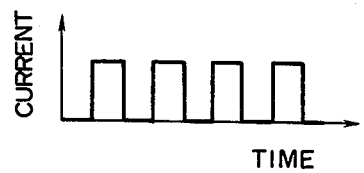
FIG. 9($a$) and 9($b$) are an illustrative view for showing a pulse current of an electric current control device.

(i) In case of No>Ns:

A pulse width of a pulse train signal to be fed to the solenoid 170 is widened by the current control circuit 190, as shown in FIG. 9(a), and a rate of time in which the control valve 148 closes the port 146 of the hydraulic pressure feeding passage 140 is extended.

Figure 9B:
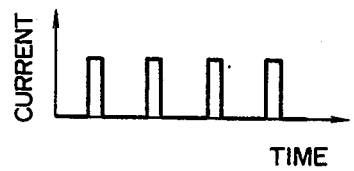

(ii) In case of No<Ns:

A pulse width of a pulse train signal to be fed to the solenoid 170 is reduced by the current control circuit 190, as shown in FIG. 9(b) and a rate of time in which the control valve 148 closes the port 146 of the hydraulic pressure feeding passage 140 is decreased. (iii) In case of No=Ns:

A pulse width of a pulse train signal is not varied.

Figure 7:
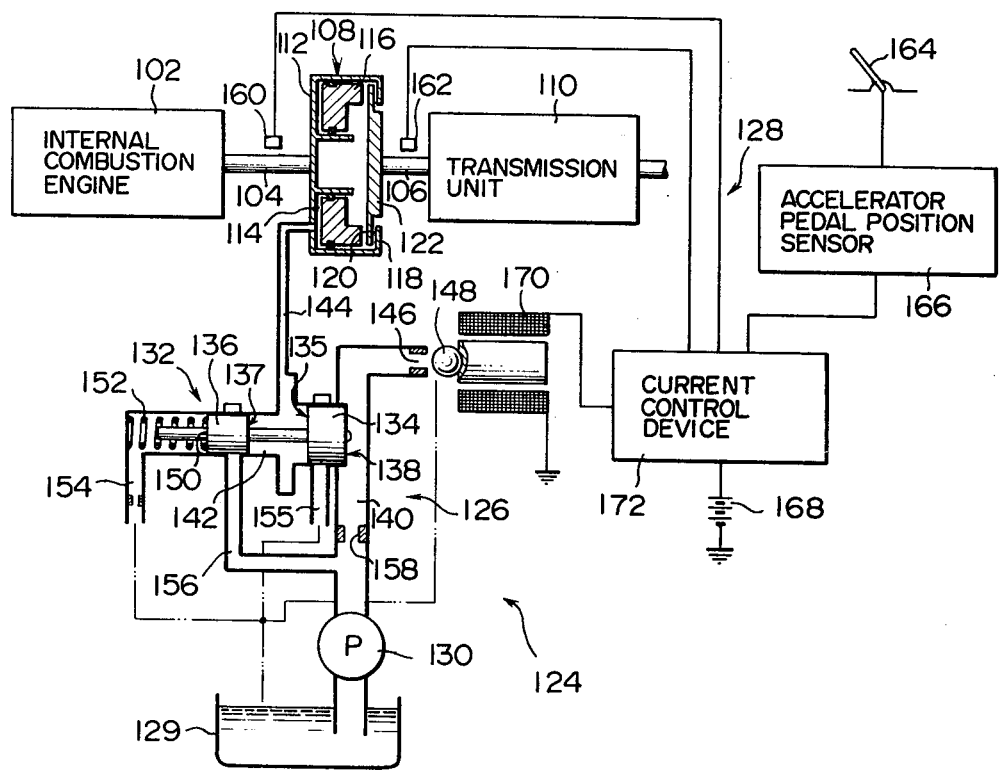
FIG. 7 is a schematic illustration for showing a second preferred embodiment of the present invention.

In case of the above mentioned (i), hydraulic pressure in the hydraulic pressure feeding passage 140 is increased, the spool valve 132 in the hydraulic pressure feeding device 124 is moved leftward as viewed in FIG. 7, the hydraulic pressure feeding chamber 142 is communicated with the hydraulic pressure feeding passage 156 to increase a hydraulic pressure therein, said hydraulic pressure is fed to the hydraulic pressure chamber 114 in the clutch device 108 to increase an engaging force of the clutch device 108, resulting in causing a difference in rotation speed No between the driving shaft 104 and the output shaft 106 to be decreased.

In case of the above mentioned (ii), hydraulic pressure in the hydraulic pressure feeding passage 140 is decreased, the spool valve 132 is moved rightward under a biasing force from the spring 152, hydraulic pressure in the hydraulic pressure feeding chamber 142 is decreased, said hydraulic pressure is fed to the hydraulic chamber 114, an engaging force of the clutch device 108 if decreased to cause a difference in rotation speed between the driving shaft 104 and the output shaft 106 to be increased.

A smoothed valve No of a difference in rotation speed between the driving shaft 104 and the output shaft 106 is made to coincide with said predetermined difference in slide rotation speed under the operation described above. To the circuit 182 is fed a signal from the accelerator pedal position sensor 166 for the accelerator pedal 164, and as illustrated in FIG. 5 of said first preferred embodiment, a predetermined slide rotation speed Ns is increased as the depression degree of the accelerator pedal 164 is increased. Further, to the electric current control circuit 190 a signal from the rotation speed sensor 160 is fed, and a pulse train signal having a maximum pulse width is flowed to the clutch-coil 170 when the driving shaft 104 exceeds a predetermined rotation speed, for example, 2,000 rpm.

Each of the circuits found in said electric current cntrol device 172 has a difference in time for use in converting or calculating a signal from each of the sensor devices, and in particular a difference in time for smoothing a difference in rotation speed, so that a delay in response might be expected.

Therefore, in particular, in case of an acceleration or deceleration period of operation, the fluctuation in torque might be transmitted due to a delay in variation of electric current to be fed to the clutch-coil 170 because of a delay in said response. Reference numeral 192 shows a variation sensor circuit for sensing a variation of depression degree of the accelerator pedal, the variation sensor circuit producing a signal for correcting a delay in response when the accelerator pedal 164 is returned back from its depressed condition.

The operation of the second preferred embodiment of the invention described above will be described in conjunction with FIG. 6 shown in said first preferred embodiment. The driving shaft 104 is driven to rotate by an engine 102 with the fluctuation in rotation speed $\pm\Delta Ne$ caused by the fluctuation in torque in respect to a mean rotation speed Ne.

In turn, the output shaft 106 is driven to rotate at a rotation speed Nt in such a way as a hydraulic pressure to be fed to the hydraulic chamber 114 in the clutch device 108 is controlled by the control device 124.

That is, the output shaft 106 is rotated at a rotation speed Nt which is lower than the fluctuation in rotation speed ±ΔNe caused by said fluctuation in torque by a predetermined high slide rotation speed Ns in respect to a rotation speed Ne of the driving shaft 104 showing the fluctuation in torque, and a transmitting torque of the clutch device 108 is set at a torque lower that of the driving shaft 104.

Therefore, the torque to be transmitted to said output shaft 106 is controlled to show a uniform torque irrespective of the fluctuation in rotation speed of the driving shaft 104 as well as the fluctuation in torque, resulting in that the fluctuation in torque of the driving shaft 104 is not transmitted.

In case that a depression degree of the accelerator pedal shows a high value to increase the fluctuation in torque, a proper slide rotation speed may be set in a wide range of operation by increasing a predetermined slide rotation speed Ns, and in turn when a depression degree of the accelerator pedal shows a low value, the slide rotation speed is decreased to improve a characteristic of response.

Further, when a mean rotation speed Ne of the driving shaft exceeds 2,000 rpm or more, a pulse width of the solenoid 170 is made to be maximum, the hydraulic pressure to be fed to the hydraulic pressure chamber 114 in the clutch device 108 is also made to be maximum, and the clutch device 108 is directly operated to improve an efficiency of power transmitting operation.

And when the accelerator pedal 164 is moved back from its depressed accelerating condition to its normal running condition, the electric current control circuit 190 is operated by a signal from the detecting circuit of changes in accelerator pedal position 192, an electric current to be fed to the solenoid 170 is made to be decreased in half for a specified period of time or a feeding of an electric current is terminated.

As described above, in accordance with the preferred embodiment of the present invention, a torque of the driving shaft 104 to be rotated along with the fluctuation in torque is transmitted to the output shaft 106 through the clutch device 108, and a hydraulic pressure to be fed to said clutch device 108 is controlled in such a manner as the following relation may be fulfilled, i.e.

|Ne-Nt| −ΔNe>0 where, Ne is a mean rotation speed of the driving shaft 104, ±ΔNe is the fluctuation in rotation speed and Nt is a mean rotation speed of the output shaft 106. Under this controlled condition, the torque is transmitted, so that the fluctuation in torque of the driving shaft 104 may not be transmitted to the output shaft 106, but only a predetermined even torque may be transmitted, resulting in that performance in low speed operation is improved in particular and fuel consumption or noise may be decreased.

It is possible to eliminate the fluctuation in torque transmitted to a transmission unit during an idling operation as low as possible and further to reduce some rattle sounds generated from said transmission unit.

Further, in accordance with the preferred embodiment of the present invention, since a pulse width to be fed to the solenoid 170 becomes narrow as compared with a maximum pulse width only in an operation range producing a slide movement in the clutch device 108, power consumption of the solenoid 170 may be reduced to show an economical system.

In the above mentioned preferred embodiment of the present invention, the pulse train signal to be fed to the solenoid 170 has been controlled by each of the signals from the detecting device 166 for a depression degree of the accelerator pedal 164, the rotation speed sensor 160 for the driving shaft 104, and rotation speed sensor 162 for detecting a mean rotation speed of the output shaft 106, but a similar operation or effect as found in said preferred embodiment may be provided if a variation in rotation speed of the output shaft 106 or the fluctuation in torque of the output shaft 106 is sensed and the pulse width of the pulse train signals to be fed to the solenoid 170 is reduced when the fluctuation in rotation speed or the fluctuation in torque is found in said output shaft 106.

Figure 10:
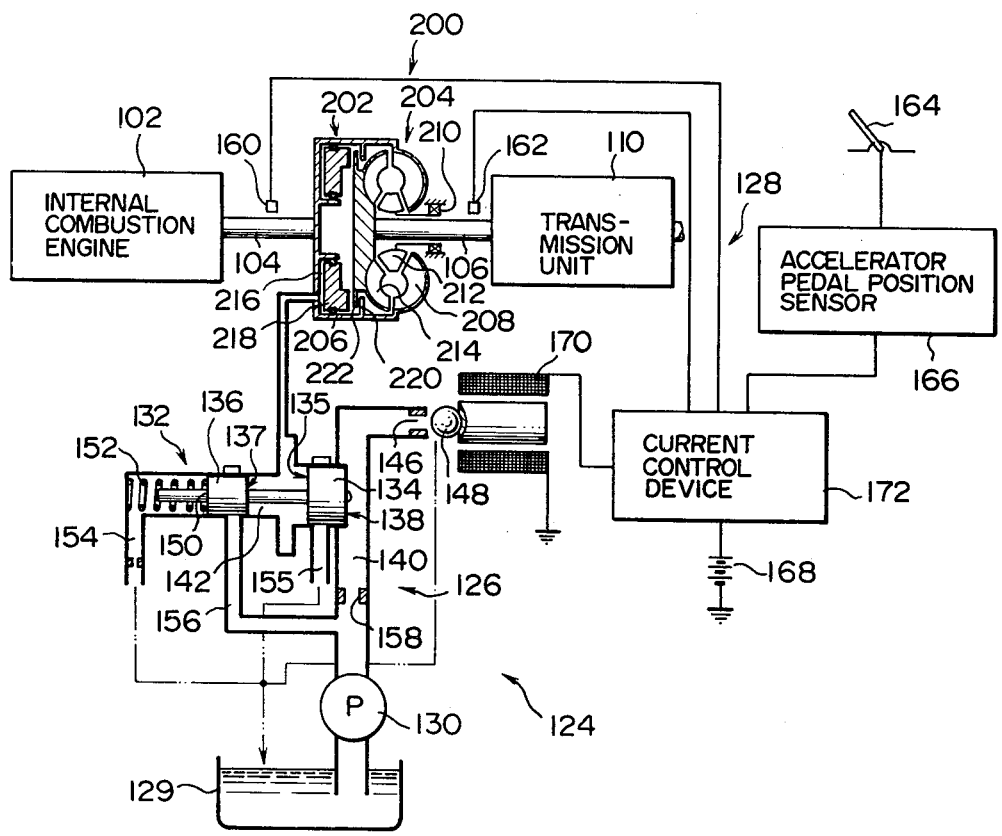
FIG. 10 is a schematic illustration for showing the third preferred embodiment of the present invention.

Referring now to FIG. 10, a third preferred embodiment of the present invention will be described. Like parts or a substantially similar component element might be indicated with a similar reference numeral, and their description will be eliminated.

Reference numeral 200 indicates a power transmission device for use in transmitting the power from the driving shaft 104 and the output shaft 106 in which the clutch device 202 and the torque convertor 204 are arranged in parallel to form another power transmitting path.

The torque convertor 204 has a pump 208 integrally assembled with a fly-wheel 206, a stator 212 connected to a proper fixing point (not shown) via one-way clutch 210, and a turbine 214 fixed to the output shaft 106.

The clutch device 202 has a piston 218 arranged to form a hydraulic chamber 216 in the fly-wheel 206, a flange 220 integrally formed with the fly-wheel 206 at a position oppositely facing the piston 218, and a clutch disk 222 integrally formed with a turbine 214 fixed to the output shaft 206 and arranged between the piston 218 and the flange 220.

The hydraulic chamber 216 in the clutch device 202 is communicated with a hydraulic chamber 142 of the hydraulic generating device 126 constituting a hydraulic feeding device 124 through the hydraulic passage 144.

Figure 8:
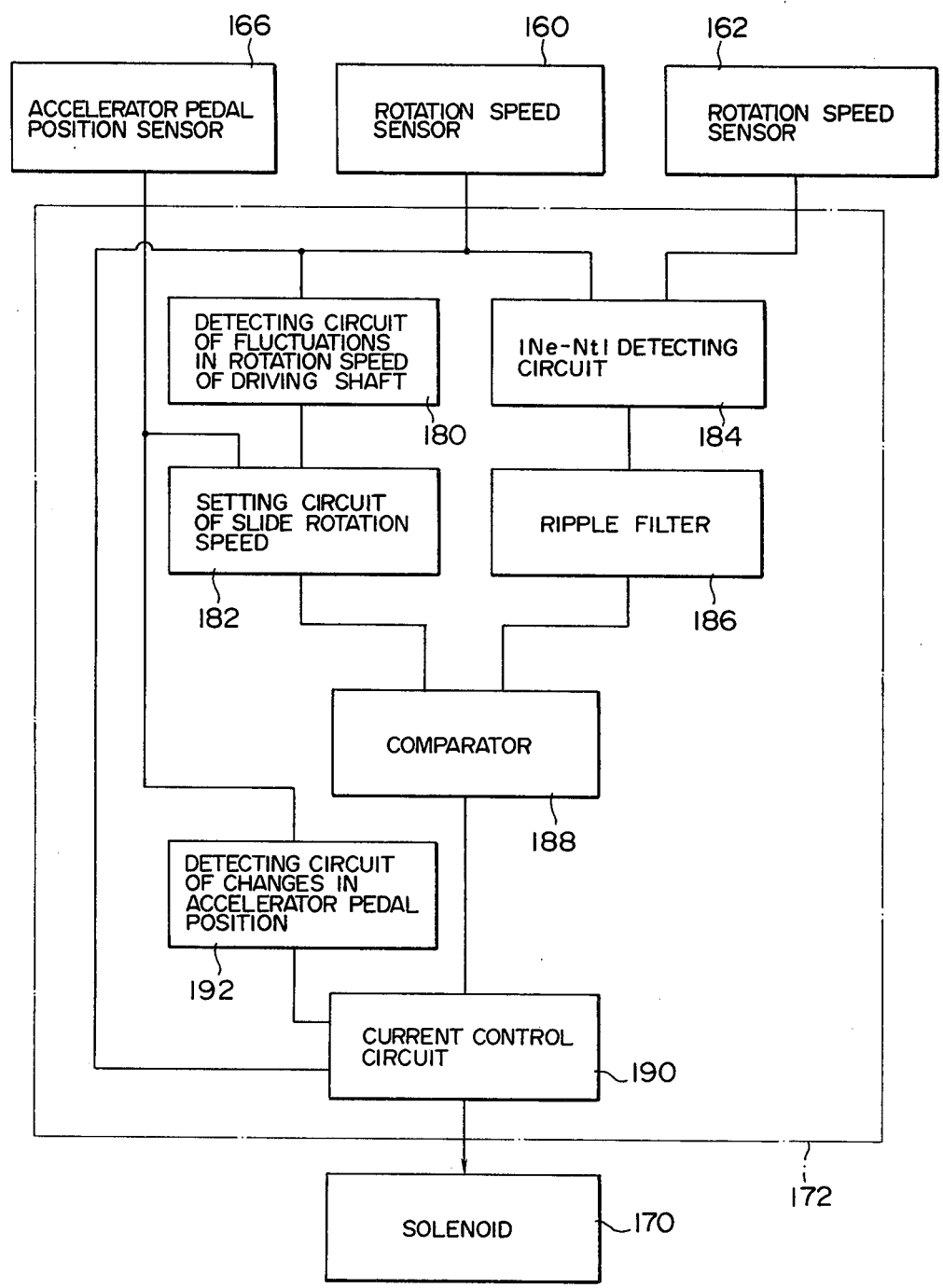
FIG. 8 is a schematic illustration for showing an electric current control device constituting a hydraulic control device.

In the preferred embodiment of the present invention, a current control device 172 shown in FIG. 8 is connected such that, in addition to the arrangement described in reference to the second preferred embodiment, it terminates a feeding of the pulse train signal for the solenoid 170 in the electric current control circuit 190 in case of a predetermined rotation speed, i.e. a low speed rotation less than 800 rpm of the driving shaft 104, and the hydraulic pressure generating device 126 produces a hydraulic pressure of zero to be fed to the hydraulic chamber 216 in the clutch device 202 through the hydraulic passage 144.

Due to this fact, at a low speed rotation less than 800 rpm, the clutch device 202 does not transmit a power force, and the driving shaft 104 and the output shaft 106 are connected only through the torque convertor 204.

In the preferred embodiment of the present invention, in a range of a rotation speed of the driving shaft 104 of 800 rpm to 2,000 rpm, both the driving shaft 104 and the output shaft 106 are rotated with a difference of a predetermined slide rotation speed Ns in the same manner as that found in said second preferred embodiment, and a torque is transmitted to the output shaft 106 without transmitting the fluctuation in torque of the driving shaft 104. In case of a low speed rotation of the driving shaft 104 less than 800 rpm, torque of the driving shaft 104 is transmitted to the output shaft 106 via a torque convertor 204. Further, in case of a high speed rotation of the driving shaft 104 more than 2,000 rpm, the clutch device 202 is directly driven and so the output shaft 106 is efficiently driven in respect to the driving shaft 104.

Therefore, in accordance with the preferred embodiment of the present invention, a similar operation or effect as that of said second preferred embodiment may be made, a specific exclusive slip for said torque convertor 204 under an intermediate speed operation ranging from 800 to 2000 rpm of the power transmitting device having a torque convertor 204 may be prevented to improve a fuel consumption.

In the preferred embodiment of the present invention, the clutch device 202 is disengaged when a depression degree of the accelerator pedal 164 is more than 80%, torque may be transmitted to the output shaft 106 only through the torque convertor 204 with the torque being amplified, and in turn when the transmission unit 110 is operated at a low speed, for example, a first speed, the clutch device 202 for full operation range is disengaged to transmit a torque only via the torque convertor 204.

What is claimed is:

1. Torque transmitting device comprising a driving shaft rotated with a tortional vibration, an output shaft, a clutch means for transmitting torque from said driving shaft to said output shaft while enabling relative rotation between said shafts, means for securing a difference in rotation speed between said driving shaft and said output shaft, means for sensing the amplitude of fluctuation in rotation speed of said driving shaft, and torque transmitting control means for controlling the transmission of torque by said clutch means from said driving shaft to said output shaft in the manner that the difference in rotation speed between said shafts is greater than the amplitude of fluctuation in rotation speed of said driving shaft sensed by said means for sensing the amplitude of fluctuation in rotation speed.

2. Torque transmitting device according to claim 1, in which said driving shaft is driven by an internal combustion engine having a throttle valve, and in which means is provided for setting the value of said difference in rotation speed in reference to the degree of opening of said throttel valve.

3. Torque transmittion device according to claim 1 in which said clutch means comprises an electro-magnetic clutch and control means comprises means for controlling an exciting current fed to said electro-magnetic clutch to control slip in said clutch.

4. Torque transmission device according to claim 1 in which said clutch means comprises a friction clutch with hydraulic pressure responsive means for variably engaging and disengaging said friction clutch to control slip therein, said control means comprises means for controlling an operating hydraulic pressure fed to said hydraulic pressure responsive means.

5. Torque transmission device according to claim 4, in which said control means comprises a source of hydraulic pressure, a hydraulic control valve controlling transmission of hydraulic pressure from said source to said hydraulic pressure responsive means of said clutch means, said hydraulic control valve being pressure responsive, a solenoid valve for adjusting the value of hydraulic pressure applied to said hydraulic control valve, and electric current control means for supplying electric current to said solenoid valve in response to signals from said means for sensing a difference in rotation speed and said means for sensing fluctuation in rotation speed of said driving shaft.

6. Torque transmission device according to claim 5, in which said solenoid valve opens or closes a port for regulating hydraulic pressure applied to said hydraulic cntrol valve in response to a pulse train signals fed from said electric current control means, the rate of opening or closing time of said port being controlled by controlling the pulse width of the pulse train signal to cause said control hydraulic pressure to be varied.

7. Torque transmission device according to claim 5, in which said driving shaft is driven by an internal combustion engine having a throttle valve and in which said electric current control means is further responsive to the degree of opening of said throttle valve.

8. Torque transmitting device comprising a driving shaft rotated with a rortional vibration, an output shaft, transmission means for transmitting torque from said driving shaft to said output shaft while enabling relative rotation between said shafts, said torque transmitting mans comprising a fluid coupling and variable clutch means in parallel with said fluid coupling, first sensing means for sensing a difference in rotation speed between said driving shaft and said output shaft, second sensing means for sensing the amplitude of fluctuation in rotation speed of said driving shaft, and means for controlling slippage in said clutch means and thereby controlling the relative rotation of said shafts in the manner that the difference in rotation speed between said shafts as sensed by said first sensing means is greater than the amplitude of fluctuation in rotation speed of said driving shaft as sensed by said second sensing means, whereby said fluctuation is not transmitted to said output shaft.

9. Torque transmission device according to claim 8, in which said clutch means comprises a friction clutch and hydraulic pressure responsive means for variably engaging and disengaging said friction clutch and control means for controlling an operating hydraulic pressure fed to said pressure responsive means.

10. Torque transmission device according to claim 9, in which said driving shaft is operated by an internal combustion engine controlled by an accelerator pedal, further comprising means for sensing the degree of depression of said accelerator pedal and for sending a signal to said control means upon a high degree of depression of said accelerator pedal, said control means being responsive to control said operating hydraulic pressure in response to a signal of high depression of said accelerator pedal to release said friction clutch.

11. Torque transmission device according to claim 9, further comprising a low speed ratio sensor for sending a signal to said control means when said transmission means is set to a low speed, said control means controlling said operating hydraulic pressure to release said friction clutch upon receiving a signal that said transmission means is set in a low speed.

12. Torque transmission device according to claim 9, in which said first sensing means includes means for sensing the rotation speed of said driving shaft and transmitting a value of rotation speed of said driving shaft to said control means, and in which said control means is responsive to rotation speed of said driving shaft below a predetermined low value to control said operating hydraulic pressure to release said friction clutch.

13. Torque transmission device according to claim 9, in which said first sensing means includes means for sensing the rotation speed of said driving shaft and transmitting a value of said rotation speed of said driving shaft to said control means, and in which said control means is responsive to rotation speed of said driving shaft above a predetermined high value to control said operating hydraulic pressure to engage said friction clutch completely without slippage.

* * * * *